United States Patent [19]

Dreibelbis et al.

[11] Patent Number: 5,728,340
[45] Date of Patent: Mar. 17, 1998

[54] PROCESS FOR POLYESTERURETHANEUREA THIN-WALLED ARTICLES

[75] Inventors: Richard Lewis Dreibelbis, Waynesboro; Nathan Eli Houser, Afton, both of Va.; Jacob Lahijani, Wilmington, Del.

[73] Assignee: E. I. du Pont de Nemours and Company, Wilmington, Del.

[21] Appl. No.: 684,067

[22] Filed: Jul. 19, 1996

Related U.S. Application Data

[63] Continuation-in-part of Ser. No. 384,894, Feb. 7, 1995, abandoned, which is a continuation-in-part of Ser. No. 965,600, Oct. 26, 1992, Pat. No. 5,391,343.

[51] Int. Cl.$^6$ ............... B29D 7/00; B28B 1/38; B28B 1/14; B28B 3/10
[52] U.S. Cl. ............... 264/216; 2/161.7; 2/168; 264/212; 264/214; 264/215; 264/305; 264/308; 524/589; 524/590; 528/44; 528/61; 528/64
[58] Field of Search ............... 264/216, 212, 264/214, 215, 305, 308; 524/589, 590; 528/44, 61, 64; 2/161.7, 168

[56] References Cited

U.S. PATENT DOCUMENTS

| | | | |
|---|---|---|---|
| 2,814,834 | 12/1957 | Hess et al. | 18/58.6 |
| 3,553,308 | 1/1971 | Kobayashi et al. | 264/305 |
| 4,218,543 | 8/1980 | Weber et al. | 528/52 |
| 5,000,899 | 3/1991 | Dreibelbis et al. | 528/52 |
| 5,061,777 | 10/1991 | Yoda et al. | 528/61 |
| 5,132,129 | 7/1992 | Potter et al. | 427/2 |

FOREIGN PATENT DOCUMENTS

| | | | |
|---|---|---|---|
| 60-33847 | 8/1985 | Japan | C08J 3/08 |
| 2181691 | 4/1987 | United Kingdom . | |

*Primary Examiner*—Patrick Niland
*Attorney, Agent, or Firm*—George A. Frank

[57] ABSTRACT

Certain polyester-based polyurethaneureas in solutions of organic solvent at a 12 to 20% concentration are particularly suited for use in a mandrel-dipping process for producing thin-walled elastic articles, such as surgical gloves, which are more resistant to puncture and tear than conventional surgical gloves made from rubber latex.

5 Claims, No Drawings

PROCESS FOR POLYESTERURETHANEUREA THIN-WALLED ARTICLES

REFERENCE TO RELATED APPLICATIONS

This application is a continuation-in-part of application Ser. No. 08/384 894 filed Feb. 7, 1995, now abandoned, which is a continuation-in-part of application Ser. No. 07/965,600, filed Oct. 26, 1992, now U.S. Pat. No. 5,391,343, issued Feb. 21, 1995.

BACKGROUND OF THE INVENTION

1. Field of the Invention

This invention relates to a process for making thin-walled elastic articles from polyesterurethaneurea solutions. More particularly, the invention concerns a process which employs particular polyesterurethaneurea solutions for making thin-walled articles, such as surgical gloves, condoms and the like, which have superior resistances to puncture and tear, compared to such articles made from conventional rubber latex.

2. Description of the Prior Art

Elastomeric gloves, such as those made from conventional rubber latex, are known for use in sterile, surgical, and chemical environments. Such gloves should have ease of donning, good fit, comfort, and tactility (i.e., the ability to feel objects through the gloves), low set and high resistance to tear and puncture. Conventional rubber-latex gloves are made by dipping a mandrel which is pre-coated with a coagulant into an aqueous rubber emulsion. To provide gloves with adequate strength and avoid pinholes, the dipped rubber-latex gloves typically are in the range of 0.18 to 0.20 mm thick. Such thicknesses somewhat limit the glove user's digital dexterity and tactility.

Hess et al, U.S. Pat. No. 2,814,834, and Kobayashi et al, U.S. Pat. No. 3,553,308, disclose substituting a synthetic polyesterurethaneurea for rubber latex to produce gloves or other thin-walled articles, by "reaction dipping" methods which include (a) coating a mandrel by dipping it into a solution of an isocyanate-terminated polyester prepolymer, (b) then dipping the thusly-coated mandrel into a solution of a diamine chain-extending agent to react the diamine with the isocyanate-terminated prepolymer to form a polyesterurethaneurea coating on the mandrel, (c) removing the solvent from the coating and (d) then stripping the coating from the mandrel to provide the finished article. Potter et al, U.S. Pat. No. 5,132,129 discloses another such process wherein an amine-terminated prepolymer is dip-coated onto a mandrel and then treated further by dipping into or being sprayed with a solution of polyfunctional curing agent which reacts with the amino ends groups to extend and/or crosslink the prepolymer chains. To improve certain mechanical properties, glove thickness can be increased by repeating the double-dipping sequence several times. Although useful, reaction dipping requires two solutions, multiple dips, a long curing time, and the prepolymer and diamine solutions respectively, are susceptible to degradation by water and oxygen.

Woodcock et al, UK Patent Application GB 2181691, discloses a glove-making process which comprises dipping a form into a solution of a polyesterurethane having polyester segments of 1,000 to 3,000 molecular weight. The only polyesterurethane specifically exemplified by Woodcock et al is made by isocyanate capping of a polyester glycol of 2,000 molecular weight under conditions that result in an 8.7% NCO content (i.e., 8.7 weight % of unreacted isocyanate groups after the capping). In contrast, the present inventors found that significantly superior gloves result when one employs a polyesterurethaneurea and a 1.4 to 2.0% NCO content instead of a polyesterurethane and such a high %NCO. Examples 1 and 5 of the present specification, illustrate the disadvantages that result when polyesterurethanes, similar to those suggested by Woodcock et al, are employed instead of polyesterurethaneureas, in accordance with those required by the present invention.

An aim of the present invention is to prepare thin-walled elastic articles, particularly surgical gloves of improved properties, from polyesterurethaneurea solutions by a process that does not suffer from the shortcomings of the above-described art.

SUMMARY OF THE INVENTION

The present invention provides a process for making thin-walled articles, such as surgical gloves and condoms, from a solution of a polyesterurethaneurea in an organic solvent. The process comprises in sequence:

preparing a polyesterurethaneurea by reacting an organic diisocyanate, preferably methylene-bis-(4-phenylisocyanate), with a polyester diol to form an isocyanate-capped prepolymer with 1.4 to 2.0 weight percent (%NCO) unreacted isocyanate groups and then chain extending the prepolymer with a diamine, the polyester diol being derived from the reaction of adipic acid with a mixture of ethylene glycol (2G) and 1,4-butanediol (4G), in the weight ratio of 2G/4G in the range of 20:80 to 80:20, preferably 40:60 to 75:25, and the chain-extending diamine, being selected from the group consisting of ethylene diamine, 1,3-diaminocyclohexane, 1,2-diaminopropane, 1,3-diaminopropane and metaxylylenediamine, the first two members of the group being preferred;

forming a solution of the polyesterurethaneurea at a concentration of 12 to 20%, preferably 14 to 17% of (based on total solution weight) in a solvent for the polyesterurethaneurea, preferably a N,N-dimethylacetamide solvent, the solvent being substantially free of metal chlorides (i.e., containing no more than 0.05%, based on the weight of polyesterurethaneurea) and having a viscosity, measured at 30° C., in the range of 25 to 125 poises;

optionally, degassing the thusly formed solution;

dipping a mandrel into the solution;

removing the mandrel from the solution, thereby forming a solution-coated mandrel;

drying the coated mandrel; and removing the resultant dried thin-walled article of polyesterurethaneurea from the mandrel.

A preferred thin-walled elastic article prepared by the above-described process of the invention is a surgical glove that is about half as thick as a conventional rubber latex surgical glove and still possesses superior tear and puncture resistance, as well as desirable set, tactility and comfort characteristics.

DETAILED DESCRIPTION OF PREFERRED EMBODIMENTS

The invention will now be described in greater detail with particular reference to the fabrication of thin-walled surgical gloves from polyesterurethaneurea solutions of the invention. The process for preparing such articles from polyetherurethaneurea solutions is the subject of the present inventors' U.S. Ser. No. 07/965,600, filed Oct. 26, 1992, now U.S. Pat. No. 5,391,343.

The term "thin-walled", as used herein, generally refers to a thickness of no greater than about 0.18 millimeters. The term polyesterurethaneurea refers to a long chain synthetic polymer that consists essentially of alternating "soft segments" of polyester and "hard segments" derived from the reaction of an isocyanate and a diamine chain extender. The isocyanate end-group content of isocyanate-terminated prepolymer is described by the %NCO. "Molecular weight" refers to number average molecular weight. Also, several abbreviations are used herein, with the following meanings:

| | |
|---|---|
| 2G | ethylene glycol |
| 4G | 1,4-butanediol |
| 6 | adipic acid |
| MDI | methylene bis-(4-phenylisocyanate) |
| PICM | ethylene bis-(4-cyclohexylisocyanate) |
| EDA | ethylenediamine |
| HMPD | 1,3-diaminocyclohexane |
| 1,2PDA | 1,2 -diaminopropane |
| 1,3PDA | 1,3-diaminopropane |
| MXD | metaxylylene diamine |
| DMAc | N,N-dimethylacetamide |

In accordance with the present invention, polyesterurethaneurea solutions are prepared by dissolving polyesterurethaneurea in a polar aprotic solvent, such as dimethylacetamide (DMAc), dimethyl sulfoxide, N-methylpyrrolidone, dimethylformamide or the like. The solution has a falling-ball viscosity in the range of 25 and 125 poise and has a polyesterurethaneurea concentration in the range of 12 to 20%. Solutions with a viscosity of greater than about 125 poise tend to trap air bubbles and are difficult to evenly dip-coat onto a mandrel. Solutions with viscosities lower than about 25 poise often wet the mandrel unevenly. Solutions with a polymer concentration in the range of 14 to 17% and a viscosity in the range of 50 to 100 poise are preferred. The lower ends of the preferred ranges are particularly preferred when two separate dipping and drying steps are employed to form articles with greater thickness.

The polyesterurethaneurea for use in the process of the invention is preferably formed from a hydroxyl-terminated adipate copolyester (2G/4G-6), which is the reaction product of adipic acid (6) and a mixture of ethylene glycol (2G) and 1,4-butanediol (4G). Typically, the weight ratio of 2G to 4G is in the range of 20:80 to 80:20, and preferably in the range 40:60 to 75:25. The hydroxyl-terminated adipate copolyester is reacted with excess diisocyanate to produce isocyanate-terminated prepolymer. As a result of the reaction, the reaction product mix contains the prepolymer and 1.4 to 2.0 weight percent of unreacted isocyanate groups (referred to herein "%NCO content"). In accordance with the invention, the %NCO content is greater than 1.4% to avoid excessive tackiness and less than 2.0% to avoid excessive load power in the final thin-walled article. The isocyanate-terminated prepolymer which is then chain extended with a diamine to form the desired polyesterurethaneurea polymer. To control molecular weight, a minor amount of a secondary amine, such as diethylamine can be used as a chain terminator. Suitable diisocyanates include MDI, PICM and the like. MDI is preferred. Suitable diamines include EDA, 1,2-PDA, 1,3-PDA, HMPD, MXD, mixtures thereof and the like. HMPD and EDA are preferred. Suitable solvents for forming solutions according to the invention include dimethylformamide, DMAc, dimethylsulfoxide, and N-methylpyrrolidone. DMAc is preferred. The copolyester glycol can have a number average molecular weight that is within a fairly wide range, typically between 1,800 and 6,000, with molecular weights in the range of 3,000 to 5,000 being preferred.

Polyesterurethaneurea made from copolyesterdiol 2G/4G-6 by capping with MDI and chain extending with HMPD is preferred for obtaining the best balance of properties in gloves fabricated by the process of the invention.

Various known additives can be included in the polyesterurethaneurea solutions of the invention and thin-walled articles made therefrom for various purposes. For example, phenolic antioxidants, such as Cyanox® 1790 (sold by American Cyanamid Co.), Santowhite Powder® 345 (sold by Monsanto Chemical Co.), the condensation polymer from p-cresol and divinyl benzene, copolymers containing tertiary amine such as DIPAM/DM (diisopropylaminoethylmethacrylate and n-decylmethacrylate in a 70/30 weight ratio), or the polyurethane formed by reaction of t-butyldiethanolamine and methylene-bis-(4-cyclohexylisocyanate) and the like. Among other additives suitable for use in the solutions and products of the invention are conventional agents, such as UV stabilizers, thermal stabilizers, pigments, dyes, titanium dioxide, and the like.

To prepare thin-walled shaped articles, such as gloves, from the solutions of the invention, entrapped and/or dissolved air or other gases are first removed from the solution. Gas removal can be accomplished by applying vacuum on the solution for a few minutes. Then, a mandrel of the desired size and shape is dipped into the degassed solution, preferably at an angle of about 80 to almost 90 degrees to the vertical with the mandrel "fingers" entering first and the palm facing upward. The mandrel is kept immersed in the solution for about 5 to 30 seconds. The solution temperature is typically at about 20° to 30° C. The mandrel may be hot or at room temperature depending on desired glove thickness. Hot mandrels result in thinner gloves.

After immersion, the mandrel is slowly removed (over a period of about 10 to 15 seconds) from the solution and excess solution allowed to drain for about 1 to 5 minutes, with the mandrel fingers in a downward position. When the mandrel is removed from the solution, a web of solution forms almost immediately between the fingers of the mandrel. Usually, draining of solution from the coated mandrel is continued until the web disappears and all dripping has substantially stopped. The coated mandrel is placed, with the fingers pointing upward, in a convection oven or infrared dryer maintained at about 150° C. for a period of about 10 to 20 minutes to remove residual solvent. Lower temperatures can be used but longer drying times are needed. Higher temperatures and/or reduced pressures can shorten the drying time. After drying, the coated mandrel is allowed to cool to room temperature. Then, the glove is removed from the mandrel. The resultant glove produced by this procedure usually has a thickness of about 0.002 to 0.003 inch (0.05 to 0.075 mm). Such thin-walled gloves are particularly desired for surgical gloves.

Gloves may be double-dipped for increased thickness, as illustrated in Examples below. Draining, drying, and glove removal, etc., may be done in the usual manner. When using a double dip for increased glove thickness, the mandrel preferably is heated to about 85° C. prior to the first dip. Such preheating helps avoid non-uniformities, such as thick-thin spots, streaks, blisters, etc., in the resultant final article. Special gloves with fingers or fingers-and-palm area of extra thickness, e.g., 0.005-inch (0.127-mm) thickness, can be made with the double-dip procedure by dipping the mandrel to the appropriate depth during the first or second dip. Similar double-dipping procedures can be used to prepare gloves or other articles having multiple layers, each of the same or a different polymer.

Preferably, the mandrel has a matte surface, is shaped for optimum glove fit, and is made of aluminum or ceramic, the latter being most preferred. Usually, it is desirable to coat the mandrels with perfluoropolymers to facilitate removal of the completed article from the mandrel without damaging the article. Perfluoropolymer sprays, such as "RemGrit TLF 50", sold by Rem Chem Division of RemGrit Corporation, of Bridgeport, Conn., are suitable. Other release agents, such as silicone oil (e.g., Dow Corning FF-400) are also satisfactory for application to the mandrels before they are dipped in the polyurethaneurea solution. Alternatively, the release agents can be mixed with the polymer solution. Removal of the article from the mandrel is also made easier by dipping the mandrel with the formed article still in place into an aqueous solution of surfactants and then removing the article from the mandrel.

A cuff can be formed on a dried glove by rolling the "sleeve" (i.e., upper wrist portion) onto itself. It is preferable to do this while the glove is still hot (about 85° C.) so that the cuff material sticks to itself without additional heat. A well-defined demarcation line at the mandrel "elbow" aids the formation of cuffs. Note that following removal of the dipped mandrel with the fingers in the down position, sufficient "drip time" should be allowed to assure that enough solution and solvent drips from the mandrel, so that when the mandrel is inverted (fingers up) for final evaporation and removal of solvent, polymer solution will not flow below the demarcation line.

Anti-tack agents, such as stearates, talc, corn starch, and the like can be applied to the inside and/or outside of the glove before packaging. Alternatively, perfluoroethylene polymers can be sprayed onto the inside and/or outside of the glove to eliminate tackiness. It is preferred to apply the perfluoroethylene polymer while the glove is still hot to improve adhesion of the perfluoroethylene particles to the surface of the glove.

Another method of preparing tack-free gloves is to dip the mandrel sequentially into different baths, each containing a different polymer solution. In a preferred version of this method, a polyesterurethaneurea layer can be formed as a middle layer between layers of polyesterurethaneurea and/or polyvinylpyrrolidone. For compatibility with the polyesterurethaneurea, DMAc is the preferred solvent for each polymer solution used to produce the layered glove.

The strength, freedom from pin-holes and general integrity of the shaped article, especially when the article is a glove, condom, or the like, is of great importance to the performance of the article. Testing for strength and freedom from leaks due to pin holes is an important quality control measure. For example, measures of these two characteristics can be made while the article is still on the mandrel or forming mold. For example, the wrist portion of a glove fan be sealed to the mandrel with an inflatable collar and then a fixed volume of air or water can be injected into the glove. A measure of the strength of the glove is indicated by the initial pressure contained by the glove; the absence of pinholes is indicated by the maintenance of a constant pressure during a predetermined time interval. After testing, the glove is deflated and removed from the mandrel. In this way, each article may be subjected to leak testing before removal from the mandrel.

TEST PROCEDURES

Various characteristics and properties mentioned in the preceding discussion and reported in the examples below are determined by the following methods.

Solution viscosity is determined in accordance with the general method of ASTM D1343–69 with a Model DV-8 Falling Ball Viscometer, (sold by Duratech Corp., Waynesboro, Va.), operated at 30° C.

Glycol number average molecular weight is determined from the hydroxyl number of the polyether diol or polyester diol. Hydroxyl number is measured by the imidazole-pyridine catalyst method described in S. L. Wellon et al., "Determination of Hydroxyl Content of Polyurethane Polyols and Other Alcohols", Analytical Chemistry, vol. 51, No. 8, pp. 1374–1376 (July 1980).

The %NCO is the unreacted isocyanate concentration in a capped prepolymer, based herein on the total weight of the capped polyester glycol and any unreacted diisocyanate used to cap the glycol. %NCO is determined from measurements made according to the method of S. Siggia, "Quantitative Organic Analysis via Functional Group", 3rd Edition, Wiley & Sons, New York, pages 559–561 (1963).

Resistance to deformation and elastic properties of samples are measured in accordance with the general method of ASTM D2731–72, except that the thread of the ASTM method is replaced by a sample of cast film of ⅛-inch (0.32-cm) width, 2-inch (5-cm) length and a measured thickness. Denier of the film is determined from the weight of a known length of a 0.32-cm-wide strip of the film. The samples are subjected to five 0-to-300% extension/retraction cycles at a constant elongation rate of 800% per minute. Load power is determined in milligrams per original denier and reported in the Examples below in deciNewtons per Tex for $LP_{100}$, $LP_{200}$ and $LP_{300}$, by measuring the load on the sample during the first cycle as the sample is extended by 100%, 200% and 300%, respectively. After completion of the fifth cycle the film strip is relaxed for 30 seconds and its increase in length is determined as a percent of its unstretched original length and reported as percent set.

Tear strength of the film samples is determined in pounds force per inch of sample thickness by the general procedure of ASTM D470–82 and is reported in the Examples in Newtons per centimeter.

Puncture resistance is measured in accordance with a procedure in which a sample of film is held in a 3½-inch-diameter (8.9-cm) circular holder in a flat, horizontal position and is then is penetrated by a vertical probe fitted with an sharp blade (i.e., a No. 10 Exacto knife blade) attached to the crosshead of an Instron testing machine, with the crosshead moving at a vertical rate of two inches per minute (5.1 cm/min). Puncture resistance is determined in pounds force per inch of sample thickness and is reported in the Examples in Newtons per cm.

The practical significance of the above described measurements with regard to typical articles of the invention (e.g., surgical gloves) is as follows. Load power at extensions of 100% and 200% represent the retractive force in a film or glove as it is stretched. An extension of 200% approximates the maximum stretch experienced when a glove is pulled on or removed. Because a glove must return to its original shape after being pulled on, a low value of no greater than 24% set is desired. High resistance to tear is needed for an article, such as a glove, to survive repeated pulling on and taking off. Tear resistance of 87 N/cm and greater is desirable, 100 N/cm and greater being preferred. Puncture resistance, preferably 87 N/cm and greater, is also highly desirable.

EXAMPLES

The invention is further illustrated by the following examples of preferred embodiments. These illustrative examples are not intended to limit the scope of the invention, which scope is defined by the appended claims. The reported results are believed to be representative but do not constitute all the runs involving the indicated materials. In the Examples, samples of the invention are designated by Arabic numerals and comparison samples by upper-case letters.

In the Examples, known methods were used to prepare solutions of polyurethaneurea polymers. The procedure for preparing copolyesterurethaneurea from 2G/4G-6 of 3,400 number average molecular weight was in accordance with Martin, U.S. Pat. No. 4,340,527, Example II, column 5, line 61, through column 6, line 4. The particular ingredients employed in each procedure are listed in the examples. In all samples of the invention, diethylamine amounting to 5 mole % of total diamines was used as a chain terminator.

EXAMPLE 1

This example shows the superior physical properties of thin-walled articles of polyurethaneurea (Samples 1 and 2) in accordance with the invention, as compared to thin-walled articles of polyurethane or of latex (comparison Samples B, C and A, respectively). The example also illustrates the preparation of gloves in accordance with the process of the invention.

Samples 1 and 2 were prepared in accordance with the procedures of the patents referred to above. Sufficient DMAc was added to adjust the solutions to about 20% solids and to a solution viscosity at 30° C. of about 125 poise. For the determination of physical properties, films were cast from the solution on polyester film with a doctor knife and then cut to size required for measurement of properties. Comparison Sample A specimens were cut from four pairs of commercial latex gloves of about 0.007 to 0.008 inch (0.18 to 0.20 mm) thickness. Samples 1 and 2 and comparison Samples B and C were each about 0.002 to 0.003 inch (0.051 to 0.076 mm) thick. The results are summarized in Table 1, below.

TABLE 1

|  | Polyurethanes | | | Polyurethaneureas | |
| --- | --- | --- | --- | --- | --- |
| Sample | A | B | C | 1 | 2 |
| Gycol | (1) | 2G/4G-6 | 2G/4G-6 | 2G/4G-6 | 2G/4G-6 |
| Diisocyanate | (1) | MDI | MDI | MDI | PICM |
| % NCO | (1) | 1.50 | 1.80 | 1.50 | 1.50 |
| Extender | (1) | 4G | 4G | EDA | HMPD |
| Load Power at 100%, | | | | | |
| mg/den | 9 | (2) | 8 | 22 | 29 |
| (dN/Tex) | 0.008 | (2) | 0.007 | 0.019 | .025 |
| at 200%, | | | | | |
| mg/den | 14 | (2) | 10 | 31 | (3) |
| (dN/Tex) | 0.012 | (2) | 0.009 | 0.027 | (3) |
| % Set | 5 | (2) | 53 | 13 | 24 |
| Tear, | | | | | |
| lb/in | 57 | (2) | 20 | 109 | 140 |
| (N/cm) | 98 | (2) | 35 | 191 | 245 |

Notes
(1) not applicable
(2) sample too tacky and not self-supporting
(3) no measurement made The data of Table 1 show that polyurethaneurea Samples 1 and 2 of the invention (made with an EDA or HMPD chain extender) have considerably higher tear strength than latex comparison Sample A and polyurethane comparison Samples B and C (made with a 4G dihydroxy chain extender). Note that comparison polyurethane Sample B, which was made with capped prepolymer having 1.5% NCO, did not form a self-supporting films. When %NCO of the polyurethane sample was raised to 1.8%, as for comparison Sample C, the comparison sample still had undesirably low tear strength and unacceptably high set. In contrast to the comparison Samples A–C, Samples 1 and 2 of the invention had desirably low set, even when the capped prepolymer had a 1.5% NCO. Also, as indicated by the load power, the polyesterurethaneurea samples of the invention were stronger, but not excessively so, than the comparison polyesterurethane samples and the latex samples.

The following procedures were used to fabricate gloves of about 0.0025-inch (0.064-mm) thickness from polymer solutions of the invention. A solution having a polymer solids content of 15% in DMAC solvent and viscosity of 80 poise was prepared. Cyanox® 1790 phenolic antioxidant (sold by American Cyanamid Co.) was added to the solution to provide a 1.5% concentration of the antioxidant, based on the weight of the polymer. A polar organopolysiloxane, Dow Corning FF-400®, amounting to 1 weight percent based on polymer, was also added to the solution to facilitate the removal of finished gloves from the mandrels. This solution was degassed at room temperature by applying a vacuum of 2 mm Hg for 5 minutes.

A ceramic mandrel of desired size and shape, and coated with polytetrafluorethylene (PTFE) release agent was dipped into the solution at an angle of 85 degrees to the horizontal with the mandrel in a fingers-down, palm-up position. The mandrel was dipped at a vertical speed of 300 cm per minute and held in the solution for 10 seconds. The mandrel, with a continuous coating of polymer adhering to its surface, was then removed at the same speed in the same configuration and allowed to drain for 2 minutes. Transient webs between the fingers separated after 1 to 2 minutes, during which time dripping from finger tips also stopped. The mandrel was then inverted into a fingers-up, palm-up position and placed in a dryer maintained at 150° C. for 10 minutes. During the drying, an initial "wet sheen" appearance of the glove turned to a more subdued sheen. After removal from the oven and cooling to 100° C., a cuff was formed on the dried glove by rolling the glove sleeve (i.e., the portion above the wrist) two turns on itself. The mandrel was then cooled to room temperature and the glove was powdered with talc and removed from the mandrel.

All of the thin-walled gloves of the invention had good tactility, elasticity, tear, and puncture resistance. Gloves made from solutions of Sample 1 were deemed to have the best overall characteristics and were superior in puncture resistance and strength to commercial latex gloves that were more than twice as thick as the gloves made according to the invention. (Typical puncture resistance measurements are reported below in Example 4.)

A double dipping process was used to prepare gloves of the same compositions as above with thicker walls to provide the gloves with even greater resistance to tearing and puncture while still maintaining satisfactory tactility. A mandrel, as described above, was heated to 90° C. and then immersed for 10 seconds in degassed polymer solution maintained at room temperature. The mandrel was tilted at an 85-degree angle in fingers-down, palm-up position when dipped and withdrawn, both at a speed of 250 cm/min. Excess solution was drained with the mandrel in the same position for 2 minutes. The mandrel was then inverted and dried in a convection oven at 150° C. for 10 minutes. The coated mandrel was removed from the oven, cooled to room temperature and dipped a second time in the solution, using the same sequence of steps as for the first dip. For some samples, the second dip was used to coat fingers only, fingers and palm, or the entire hand. Satisfactory gloves were produced.

EXAMPLE 2

This example illustrates effects of the 2G/4G ratio and the molecular weight of the copolyester glycol on the properties polyesterurethaneurea films. Solutions of polymers were prepared according to the general methods of Example 1, with minor adjustments being made to produce the polymers described in Table 2 below. All polymers of this example were formed with 2G/4G-6 glycol, MDI, 1.50% NCO, HMPD chain extender and 5 mole % (based on total diamines) of diethylamine chain terminator. Films were cast from the polymer solutions and their properties determined as in Example 1.

TABLE 2

| Sample | 3 | 4 | 5 | 6 | 7 | 8 | 9 |
|---|---|---|---|---|---|---|---|
| Glycol MW | 3710 | 6056 | 3000 | 3400 | 5141 | 3182 | 6124 |
| 2G/4G ratio | 20/80 | 28/72 | 46/54 | 60/40 | 60/40 | 75/25 | 80/20 |
| $LP_{100}$, | | | | | | | |
| mg/den | 15 | 15 | 15 | 15 | 15 | 13 | 12 |
| (dN/Tex) | 0.013 | 0.013 | 0.013 | 0.013 | 0.013 | 0.011 | 0.010 |
| % Set | 31 | 30 | 14 | 13 | 12 | 15 | 24 |
| Tear, | | | | | | | |
| lb/in | 139 | 128 | 111 | 89 | 85 | 77 | 71 |
| (N/cm) | 243 | 224 | 194 | 156 | 149 | 135 | 124 |

The data of Table 2 indicate that 2G/4G ratios in the range of 20:80 to 80/20 can be useful, but ranges of 35:65 to 75:25 are much preferred, because of lower set. The ratio of 2G/4G apparently has stronger effects than the glycol molecular weight within the ranges of this example.

EXAMPLE 3

The effects of different chain-extension agents on polyesterurethaneurea polymers made with 2G/4G-6 glycol in accordance with the invention are illustrated in this example. Polymer solutions were prepared and films prepared from the solutions in accordance with the procedure of Example 1, with adjustments being made to produce the samples described in Table 3 below. For each sample, MDI, 1.50% NCO, and 2G/4G-6 (60/40) of 3400 number average molecular weight were used to prepare the polymers. For comparison, data on films of Samples 6 (Example 2) and 1 (Example 1) are included in Table 3.

TABLE 3

| Sample | 6 | 1 | 10 | 11 | 12 |
|---|---|---|---|---|---|
| Extender | HMPD | EDA | MXD | 1,3-PDA | 1,2-PDA |
| $LP_{100}$, | | | | | |
| mg/den | 15 | 22 | 20 | 17 | 18 |
| (dN/Tex) | 0.013 | 0.019 | 0.018 | 0.015 | 0.016 |
| % Set | 13 | 13 | 22 | 23 | 21 |
| Tear, | | | | | |
| lb/in | 89 | 109 | 85 | 87 | 97 |
| (N/cm) | 156 | 191 | 149 | 152 | 170 |

The data of Table 3 show the suitability of HMPD, EDA, MXD, 1,3-PDA, AND 1,2-PDA as chain extenders for the polymers intended for making thin-walled articles in accordance with the invention. As shown in Table 3, the best balance of elastic properties (i.e., low, but sufficient, load power and low % set) accompanied by high tear strength and puncture resistance, was obtained when HMPD or EDA was the chain extender.

EXAMPLE 4

This example compares the puncture resistance of thin-walled films made with typical polymer compositions according to the invention with the puncture resistance of strips cut from commercial, rubber latex surgical gloves. The film samples of the invention were about 0.0025-inch (0.064-mm) thick and the rubber latex samples were about 0.0075-inch (0.191-mm) thick. The samples of the invention were prepared in accordance with the procedures of Example 1. Table 4 summarizes their puncture properties. Samples 13 and 14 of the invention were made with 60/40 2G/4G-6 prepolymer of 3400 number average molecular weight and with MDI as the diisocyanate. The chain extender and %NCO employed are listed in Table 4 below, along with the measured puncture resistance of each film sample. For greater puncture resistance in thin-walled polyesterurethaneurea articles in accordance with the invention, EDA is a preferred chain extender. Note also, the great superiority in puncture resistance possessed by Samples 13 and 14 of the invention over comparison Sample D taken from conventional rubber latex surgical gloves.

TABLE 4

| | | | Puncture Resistance | |
|---|---|---|---|---|
| Sample | % NCO | Extender | lb/in | N/cm |
| 13 | 1.8 | EDA | 100 | 175 |
| 14 | 1.5 | HMPD | 80 | 140 |
| D | — | — | 25 | 44 |

EXAMPLE 5

This example demonstrates the process and product advantages obtained in fabricating thin-walled articles according to the invention from solutions of polyesterurethaneureas (made with 1.5 to 2.0% NCO after the capping reaction) as compared to such articles fabricated from solutions of polyesterurethanes, especially polyesterurethanes made with high %NCO. Such polyesterurethanes, made with high %NCO are typical of those disclosed for example by Woodcock et al, GB 2181691. The example clearly shows the advantage of preparing the polymer according to the invention with diamine chain extenders, which form the urea linkages, rather than with glycol chain extenders, which form only urethane linkages.

In this example, five pairs of thin-walled samples were prepared. The general procedures of Example 1 were employed to produce the polymer solutions. The solutions were applied to polyester films with a doctor knife, dried at room temperature, and then carefully separated from the polyester film to provide the samples from which the properties were determined. The samples ranged in thickness from 0.0019 to 0.0032 inch (0.05 to 0.08 mm). All samples were prepared from solutions of 2G/4G-6 copolyester glycol and capped with MDI. Measured properties of the samples and other details of the tests are summarized below in Table 5 for Pairs I and II, and in Table 6 for Pairs III, IV and V.

For the first two pairs of samples (Pairs I and II), the copolyester glycol had a 2G/4G ratio of 50/50 and a number average molecular weight of 2,000. For the other three pairs of samples, the corresponding values were 60/40 and 3,400. The diisocyanate employed for capping each copolyester glycol was MDI. For each pair of samples, the isocyanate capped glycol of one sample was chain extended with ethylene diamine ("EDA") and the other with 1,4-butane diol ("4G"). The sample pairs were made employing the following %NCO:

Pair I, 4G (Sample E) vs. EDA (Sample F) at 8.7% NCO.

Pair II, 4G (Sample G) vs. EDA (Sample 15) at 2.0% NCO.

Pair III, 4G (Sample H) vs. EDA (Sample I) at 6.0% NCO.

Pair IV, 4G (Sample J) vs. EDA (Sample 16) at 2.0% NCO.

Pair V, 4G (Sample K) vs. EDA (Sample 17) at 1.5% NCO.

Note that desirable thin-walled articles, such as gloves, require low set so that the glove can retain its shape and conform well to the hand. Gloves made from polymers that have excessive load power squeeze the hand too tightly and reduce comfort. High tear strength permits the fabrication of gloves with thinner walls, which in turn results in improved tactile sensitivity for the wearer.

TABLE 5

|  | Pair | | | |
|---|---|---|---|---|
|  | I | | II | |
| Sample | E | F | G | 15 |
| 2G/4G ratio | 50/50 | 50/50 | 50/50 | 50/50 |
| 2G/4G-6 MW | 2,000 | 2,000 | 2,000 | 2,000 |
| % NCO | 8.7 | 8.7 | 2.0 | 2.0 |
| Chain extender | 4G | EDA | 4G | EDA |
| $LP_{100}$, |  |  |  |  |
| mg/den | 60 | (1) | (2) | 29 |
| (dN/Tex) | 0.052 | nm | nm | 0.025 |
| % Set | 54 | nm | nm | 22 |
| Tear, |  |  |  |  |
| lb/in | 140 | nm | nm | 162 |
| (N/cm) | 245 | nm | nm | 284 |

Notes:
(1) solution gelled; (2) too gummy to be cast into film; nm = no measurement made As can be seen from Table 5, Sample 15 of the invention has high tear resistance, low set and a satisfactory load power compared to Samples E, F and G. Sample 15 was made under conditions of 2.0% NCO and with a diamine chain extender that provided the urea linkages in the polyesterurethaneurea. Samples E and G were made with a diol chain extender and therefore contained no urea linkages. Also, Samples E and F, both of which were made with 8.7% NCO, were well outside the 1.4–2.0% NCO range required in the present invention. The diol-extended sample (Sample E) had good tear resistance, but had excessive set and excessive load power. When a diamine chain extender was used, as in Sample F, the very high %NCO did not permit satisfactory films to form.

TABLE 6

|  | Pair | | | | | |
|---|---|---|---|---|---|---|
|  | III | | IV | | V | |
| Sample | H | I | J | 16 | K | 17 |
| 2G/4G ratio | 60/40 | 60/40 | 60/40 | 60/40 | 60/40 | 60/40 |
| 2G/4G-6 MW | 3,400 | 3,400 | 3,400 | 3,400 | 3,400 | 3,400 |
| % NCO | 6.0 | 6.0 | 2.0 | 2.0 | 1.5 | 1.5 |
| Chain extender | 4G | EDA | 4G | EDA | 4G | EDA |
| $LP_{100}$, |  |  |  |  |  |  |
| mg/den | 32 | (1) | 9 | 27 | (2) | 22 |
| (dN/Tex) | 0.028 | nm | 0.008 | 0.023 | nm | 0.019 |
| % Set | 33 | nm | 29 | 19 | nm | 15 |
| Tear, |  |  |  |  |  |  |
| lb/in | 91 | nm | (3) | 131 | nm | 128 |
| (N/cm) | 15B | nm | (3) | 228 | nm | 224 |

Notes:
(1) solution gelled;
(2) too gummy to be cast into film;
(3) too weak to measure;
nm = no measurement made The results summarized in Table 6, again show that use of high %NCO (Samples H and I) allows processing of diol-extended polyurethane, but still results in relatively high set and low tear strength, which are undesirable for thin-walled surgical gloves. The high %NCO of Sample I did not permit a satisfactory film to be formed with diamine-extended polymer. At 2.0% NCO, as shown by diol-extended comparison Sample J and diamine-extended Sample 16 of the invention, the diol-extended polymer film was too weak for one to measure its tear strength while diamine-extended polymer Sample 16 had a good balance of properties. Note that at the still lower 1.5% NCO, diol-extended comparison Sample K could not be cast into film because of the excessive gumminess of the solution. In contrast, diamine-extended Sample 17 of the invention had fully satisfactory properties.

EXAMPLE 6

This example compares the load and unload power, % set, and tear resistance of various films. It shows that films made with the composition and process of the invention have a superior balance of elastic properties (load and unload power, and % set) and tear strength.

The polymers and film properties are described in Table 7 below. All polymers of this example were formed with 60/40 2G/4G-6 polyester glycol having the indicated molecular weight, MDI and the indicated %NCO and chain extender.

The film of Sample L was prepared by the two-stage dip method of U.S. Pat. No. 3,553,308 ("Kobayashi"). 20 parts of capped glycol, made from 13.4 parts MDI and 100 parts 2G/4G-6 copolyester glycol, were diluted with 100 parts acetone. A mold consisting of a glass test tube, about 20 cm long and 3 cm in diameter, and made of standard glass, was dipped straight down (closed end down, open end up) into the capped glycol solution at a vertical speed of about 25 mm per second. The mold was held in the solution for 30 seconds, then raised out at a vertical speed of about 500 mm per minute and dried in air at room temperature for 30 seconds. At the end of the 30 seconds, the mold was dipped straight down at a vertical speed of about 25 mm per second, into a diamine solution containing 0.25 grams of EDA in 100 grams hexane, held in the solution for 30 seconds, then raised out at a vertical speed of about 500 mm per minute and dried in air at room temperature for 30–60 seconds. This process of dipping into and raising out of the two solutions was repeated 5 times. After the last raising, the film on the surface of the mold was dried thoroughly at room temperature. Finally, the film was powdered with talc, removed from the mold, and cut to the size required for the measurement of properties. The final film was about 16 microns thick.

The films of Samples 18 and 19 are samples of the present invention. These films and the composition of Sample O were prepared in accordance with the procedures of Example 1 of this application. Sufficient DMAc was added to adjust the polyurethaneurea solutions to about 20% solids and to a solution viscosity at 30° C. of about 125 poise. In Samples 18 and 19, films were cast from the solutions on polyester film with a doctor knife and then cut to the size required for the measurement of properties. The films of Samples 18 and 19 were each about 5–10 microns thick.

The films of Samples M, N and P were each prepared by the method disclosed in U.K. Patent Application GB 2181691 ("Woodcock"). Sample M is a replication of Woodcock Example 1 except for a minor difference in the molecular weight of the 2G/4G-6 polyester glycol (2,058 in Sample M versus 2,000 in Woodcock Example 1). Sample N replicates Woodcock Example 1, but using a 2G/4G-6 polyester glycol of 3000 MW. Sample P was prepared according to Woodcock Example 1, but using a 2G/4G-6 polyester glycol of 3000 MW and a %NCO of 2.0. The films of Samples M, N and P were each about 10–20 microns thick.

TABLE 7

| Sample | L | 18 | M | N | O | 19 | P |
|---|---|---|---|---|---|---|---|
| 2G/4G ratio | 60/40 | 60/40 | 60/40 | 60/40 | 60/40 | 60/40 | 60/40 |
| 2G/4G-6 MW | 3,400 | 3,400 | 2,058 | 3,000 | 3,000 | 3,000 | 3,000 |
| % NCO | 1.8 | 1.8 | 8.6 | 6.5 | 6.5 | 2.0 | 2.0 |
| Chain extender | EDA | EDA | 4G | 4G | EDA | EDA | 4G |
| Tear, | | | | | | | |
| lb/in | 44 | 88 | 147 | 101 | (1) | 107 | 19 |
| (N/cm) | 77 | 154 | 257 | 177 | nm | 187 | 33 |
| % Set | 16 | 20 | 57 | 42 | nm | 23 | 27 |
| $LP_{100}$, | | | | | | | |
| mg/den | 24 | 24 | 55 | 33 | nm | 25 | 8 |
| (dN/Tex) | 0.021 | 0.021 | 0.049 | 0.029 | | 0.022 | 0.007 |
| $LP_{200}$, | | | | | | | |
| mg/den | 34 | 34 | 76 | 45 | nm | 36 | 12 |
| (dN/Tex) | 0.030 | 0.030 | 0.067 | 0.040 | | 0.032 | 0.011 |
| $LP_{300}$, | | | | | | | |
| mg/den | 48 | 48 | 116 | 64 | nm | 51 | 16 |
| (dN/Tex) | 0.042 | 0.042 | 0.102 | 0.057 | | 0.045 | 0.014 |

The films of Sample L and Sample 18 were made using the same polyester glycol, the same diisocyanate, the same %NCO and the same chain extender. The ratio of isocyanate to glycol (NCO/OH) is 1.83 for both samples. Sample L was made using the two-step dipping process of Kobayashi whereas Sample 18 was made by the process of the invention. As can be seen from Table 7, Sample 18 of the invention has high tear resistance, comparably low load power and satisfactory set compared to Sample L. That is, Sample 18 had the desired combination of elastic properties (low load power, low set) and high tear resistance. Sample L had good elastic properties but low tear resistance.

Except for the minor difference in the molecular weight of the glycol, Sample M replicates Example 1 of Woodcock. The NCO/OH ratio in both Sample M and Example 1 of Woodcock was 4.15. As can be seen in Table 7, Sample M of the Woodcock method had high tear strength but poor elastic properties (high load power, high set) compared to Sample 19 of the invention.

In Sample N, Sample M was repeated using a 3000 MW polyester glycol and the same NCO/OH ratio of 4.15. For comparison, Sample O was prepared using the same glycol and the same NCO/OH ratio as Sample N but with a chain extender (EDA) and the process of the invention. Note that at the NCO/OH ratio of 4.15 in Sample O the %NCO was 6.5, which amount is outside the scope of the invention. The composition of Sample O could not be cast into a film because it gelled.

In Sample 19, Sample O was repeated with 2.0% NCO (NCO/OH=1.82) instead of 6.5% NCO (NCO/OH=4.15). For comparison, Sample P was prepared by repeating Sample N with 2.0% NCO (NCO/OH=1.82) instead of 6.5% NCO (NCO/OH=4.15). That is, Sample P repeated Woodcock Example 1 using a 3000 MW polyester glycol, 2.0% NCO and an NCO/OH ratio of 1.82. Thus, the films of Sample P and Sample 19 were each made using the same polyester glycol, the same diisocyanate, the same %NCO, and the same NCO/OH ratio. Sample P was made using the 4G chain extender and the process of Woodcock whereas Sample 19 was made with the EDA chain extender and the process of the invention. As can be seen from Table 7, Sample P had very low tear resistance and adequate elastic properties (very low load power, satisfactory set) compared to Sample 19 of the invention. Again, the sample of the invention had the desired combination of elastic properties and high tear resistance, and the comparison film did not.

We claim:

1. A process for making a thin-walled elastic article comprising, in sequence:

preparing a polyesterurethaneurea by reacting methylene-bis-(4-phenyl-isocyanate) with a polyester diol to form an isocyanate-capped prepolymer having a %NCO in the range of 1.4 to 2.0 weight %, the polyester diol having been derived from the reaction of adipic acid with a mixture of ethylene glycol (2G) and 1,4-butanediol (4G) in the weight ratio of 2G/4G in the range of 20:80 to 80:20 and having a number average molecular weight in the range of 3,000 to 5,000, and chain-extending the prepolymer with a diamine being selected from the group consisting of ethylene diamine, 1,3-diaminocyclohexane, 1,2-diaminopropane, 1,3-diaminopropane and metaxylylene diamine;

forming a solution of the polyesterurethaneurea in an organic solvent for the polyesterurethaneurea at a polyesterurethaneurea concentration of 12 to 20%, based on total solution weight, the solution having a viscosity, measured at 30° C., in the range of 25 to 125 poises;

optionally, degassing the thusly formed solution;

dipping a mandrel into the solution;

removing the mandrel from the solution, thereby forming a solution-coated mandrel;

drying the coated mandrel; and removing the resultant dried thin-walled article of polyesterurethaneurea from the mandrel.

2. A process in accordance with claim 1 wherein the polyesterurethaneurea concentration is in the range of 14 to 17%, and the solution viscosity is in the range of 50 to 100 poise.

3. A process in accordance with claim 1 wherein the weight ratio of the ethylene glycol to 1,4-butylene glycol is in the range of 40:60 to 75:25 and the chain-extending diamine is 1,3-diaminocyclohexane or ethylene diamine.

4. A process in accordance with claim 3 wherein the weight ratio of the ethylene glycol to 1,4-butylene glycol is in the range of 40:60 to 75:25 and the chain-extending diamine is 1,3-diaminocyclohexane or ethylene diamine.

5. A thin-walled elastic article prepared by a process in accordance with claim 1 wherein the article is a glove having a thickness in the range of 0.05 to 0.08 mm, a puncture resistance of at least 87 N/cm, a set of no greater than 24% and a tear resistance of at least 87 N/cm.

* * * * *